United States Patent [19]

Seiferling

[11] Patent Number: 4,567,766
[45] Date of Patent: Feb. 4, 1986

[54] PIEZOELECTRIC ULTRASONIC APPARATUS AND METHOD FOR DETERMINING THE DISTANCE FROM A PREDETERMINED POINT TO A TARGET

[75] Inventor: James E. Seiferling, Rio Vista, Calif.
[73] Assignee: Blackwelders, Rio Vista, Calif.
[21] Appl. No.: 591,437
[22] Filed: Mar. 20, 1984
[51] Int. Cl.⁴ ............................................. G01N 29/00
[52] U.S. Cl. ........................................ 73/597; 73/610; 367/122; 310/315
[58] Field of Search ................ 73/597, 598, 609, 610, 73/614; 367/122; 310/315

[56] References Cited

U.S. PATENT DOCUMENTS

| | | | |
|---|---|---|---|
| 3,512,399 | 5/1970 | Weinbaum | 73/614 |
| 3,553,636 | 1/1971 | Baird | 73/597 |
| 3,697,936 | 10/1972 | Zacharias, Jr. et al. | 73/597 |
| 3,720,098 | 3/1973 | Dixon | 73/597 |
| 3,808,879 | 5/1974 | Rogers | 73/609 |
| 4,102,205 | 7/1978 | Pies et al. | 73/614 |
| 4,254,660 | 3/1981 | Prause | 73/597 |
| 4,480,474 | 11/1984 | Kazama et al. | 73/614 |

Primary Examiner—Howard A. Birmiel
Attorney, Agent, or Firm—Owen, Wickersham & Erickson

[57] ABSTRACT

A distance-determining detector and method. A piezoelectric ultrasonic transceiver sends out pulses and receives their reflection and produces an analog output and a trigger output. The analog output is given effect only when it exceeds a threshold level, as shown by a comparator. The trigger output is used for disabling detection during transmission of the transmitter pulse and for producing a time interval during which the analog output is valid, when enabled. An AND gate is connected to the comparator and to the enabled trigger output. Clock pulses are counted, and a flip-flop circuit is connected to the counter and to the output from the AND gate. A multiplying digital-to-analog converter is connected to the flip-flop circuit for determining the distance. There may also be temperature compensation and scaling for the converter for validating the output thereof over a wide range of temperatures.

5 Claims, 5 Drawing Figures

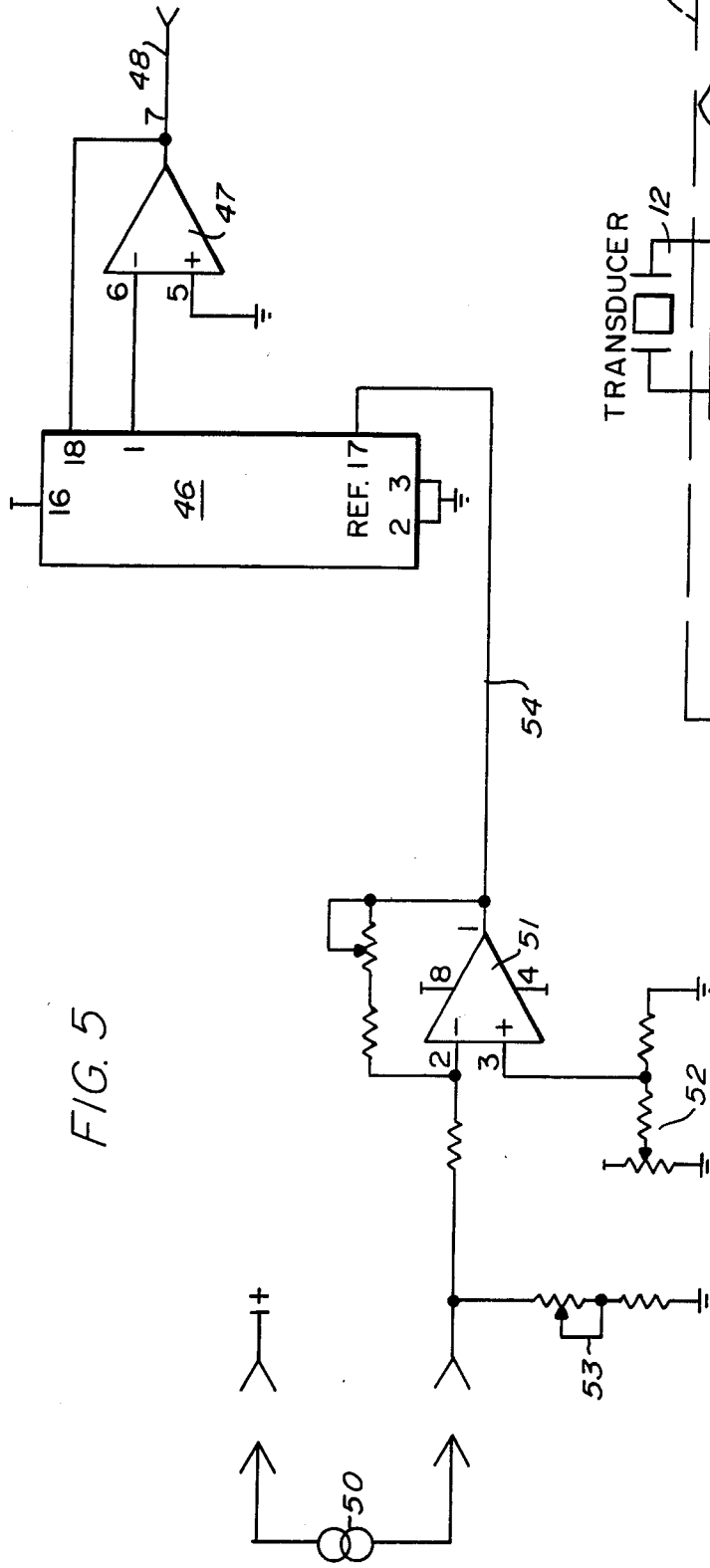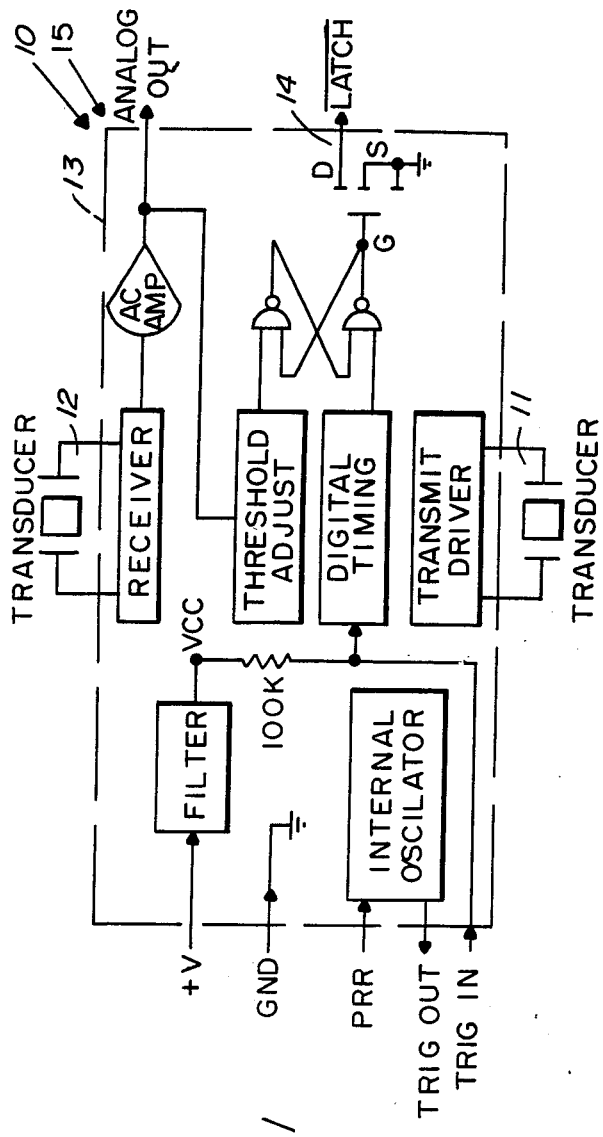
FIG. 5
FIG. 1

4,567,766

PIEZOELECTRIC ULTRASONIC APPARATUS AND METHOD FOR DETERMINING THE DISTANCE FROM A PREDETERMINED POINT TO A TARGET

This invention relates to an ultrasonic distance-determining apparatus with its related electronic circuit and to a distance determining method.

BACKGROUND OF THE INVENTION

Ultrasonic devices for determining distances have heretofor tended to be expensive because of the complex circuitry involved. Until recently crystal-generated ultrasonic signals started at very small amplitude and only gradually increased to a peak value, held at the peak value for a time, and then gradually decreased.

On the other hand, electrostatic devices required expensive and complex circuitry. One of the best such devices required four circuit boards, and this complexity also rendered failure more likely.

Recently, advances in piezoelectric technology has made crystal-type transducers less expensive, more rugged, easily cleanable and also able to produce a fast rise time pulse that makes high resolution possible. The present invention makes it possible to provide a simple relatively inexpensive decoding circuit, so that overall the cost per unit including both the transducer and the circuit is less than half of that of the electrostatic transducer-circuit combination. The system of this invention requires only a single circuit board and, having many fewer parts, is less likely to fail. Moreover, if a component should fail, it becomes much easier and quicker to locate the trouble and remedy it.

SUMMARY OF THE INVENTION

The invention comprises apparatus and method for determining the distance from a preselected point to a target. The apparatus directs an ultrasonic signal from a piezoelectric transducer at a preselected point toward the target, receives a reflection signal back from the target, and converts the time delay into the corresponding distance causing the time delay.

A circuit actuated by the receiver produces a linear, temperature-corrected voltage which is proportional to the distance of a target from the piezoelectric transducer. The circuit can be broken down into three sub-circuits: (1) an input interface circuit, (2) a counter and multiplying digital-to-analog converter circuit, and (3) a temperature measurement and compensator circuit.

In the first circuit the analog output from the transceiver is inverted by an A.C. coupled amplifier, and the output is fed to one input of a comparator. The other input to the comparator has a D.C. voltage which sets the threshold level which the return echo must exceed before an output pulse is produced.

A trigger output from the transceiver is fed to two one-shot multivibrators in series. The first one disables the detector during the time the transducer is ringing from the transmit pulse. The second one produces a positive pulse during which a valid echo may be detected.

The output signal from the second one-shot multivibrator and the output from the comparator are then fed to an AND gate. When an echo is present during this time window, a positive pulse is generated by the AND gate to drive another one-shot multivibrator which generates a carry-out pulse, so that only the first echo is detected in each transmit/receive cycle.

In the second circuit, clock pulses are generated and a signal fed to three, four-bit binary counters wired in series and connected to two hex "D" type flip-flops. The outputs from the flip-flops go to the inputs on a multiplying digital-to-analog converter. An operational amplifier provides the analog output. The counters are set to zero and restarted each cycle by the trigger output of the transceiver. Data is transferred from the input to the output of the flip-flops by the positive-going edge of the received pulse from the one-shot multivibrator of the first circuit. If an echo is not received during a transmit/receive cycle, the last echo received is retained in the flip-flop output.

Temperature compensation and scaling of the multiplying digital-to-analog converter are accomplished in the third circuit by applying a temperature-dependent voltage to the reference input of the multiplying digital-to-analog converter. A temperature transducer is used to detect the outside ambient temperature, and its amplified output voltage, is applied to the multiplying digital-to-analog converter, the output is properly scaled, regardless of the ambient temperature.

Other features, objects, and advantages of the invention will appear from the following description of a preferred embodiment.

BRIEF DESCRIPTION OF THE DRAWINGS

FIG. 1 is a functional block diagram of a commercially available ultrasonic transmitter-receiver unit of a type suitable for use in the present invention.

FIG. 5 is a diagram of the temperature measurement and compensator according to the invention.

DESCRIPTION OF A PREFERRED EMBODIMENT

Figure 2:
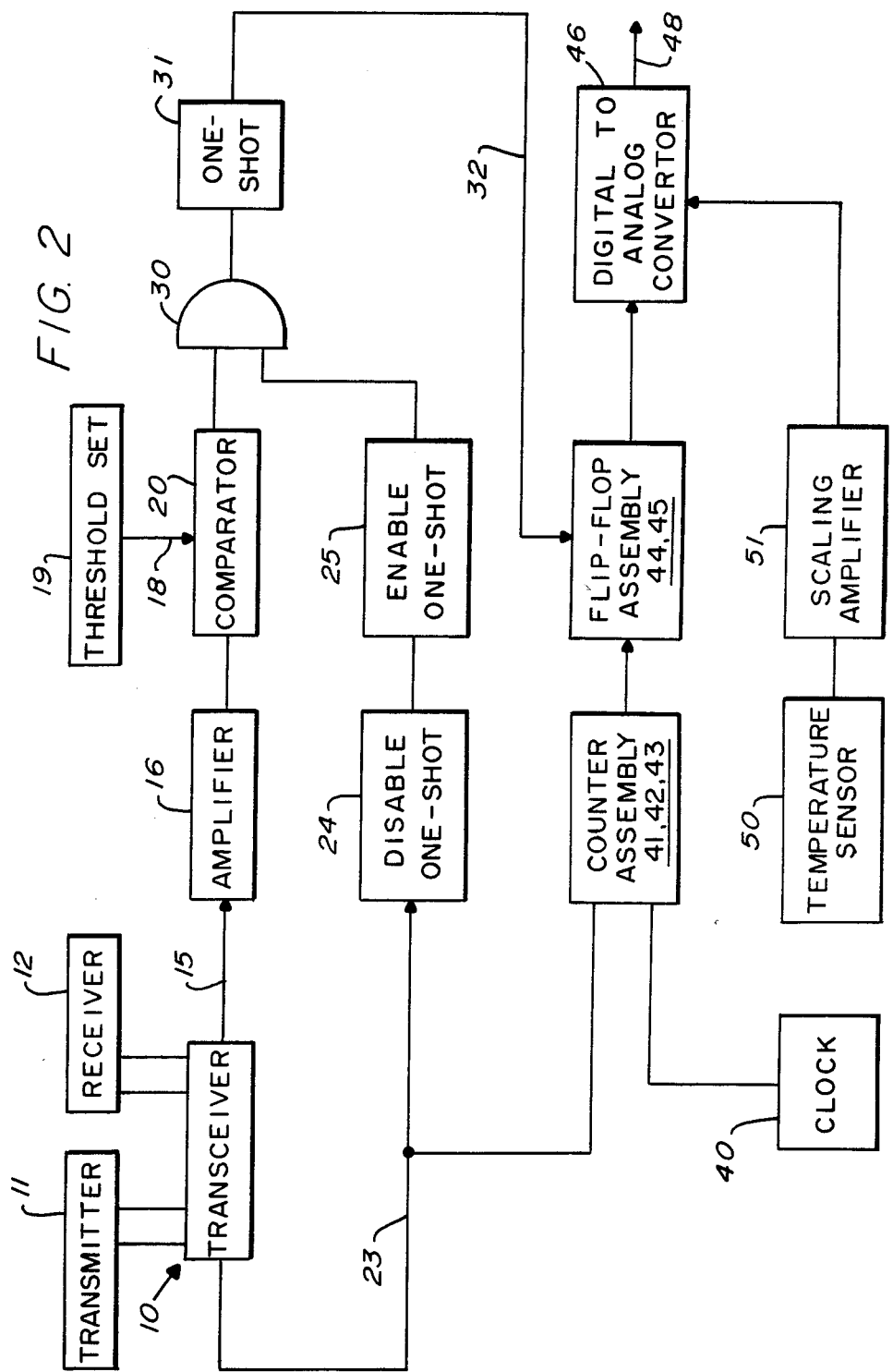
FIG. 2 is a simplified block diagram of the overall circuit embodying the principles of the invention.

A transceiver 10 suitable for use in this invention is manufactured by Massa Products Corp.

FIG. 1 shows a functional block diagram of a Massa Model E-201 Ultrasonic Ranging Module 10, an electronic device supplied with a transmitting transducer 11, a receiving transducer 12 and an interface electronics module 13. The transducer 11 transmits a 215 kHz narrow-beam acoustic pulse, and the receiving transducer 12 detects the reflected echo. Actually, the transducers are located adjacent to each other, and they provide a digital $\overline{\text{LATCH}}$ pulse at an output 14 and an analog pulse at output 15.

The present invention uses the analog output 15 rather than the $\overline{\text{LATCH}}$ output 14 in order to incorporate a variable threshold. This is desirable because different types of targets have different coefficients of acoustic reflection. The non-adjustable $\overline{\text{LATCH}}$ output is better adapted for use with very hard targets, such as concrete, while the analog output is better adapted for dirt and sand where a lower threshold is desirable.

The block-diagram circuit of FIG. 2 can be broken down into three sub-circuits: (1) an input interface circuit (shown in more detail in FIG. 3), (2) a counter and multiplying digital-to-analog converter circuit (shown in more detail in FIG. 4), and (3) a temperature measurement and compensator circuit (shown in more detail in FIG. 5).

Figure 3:
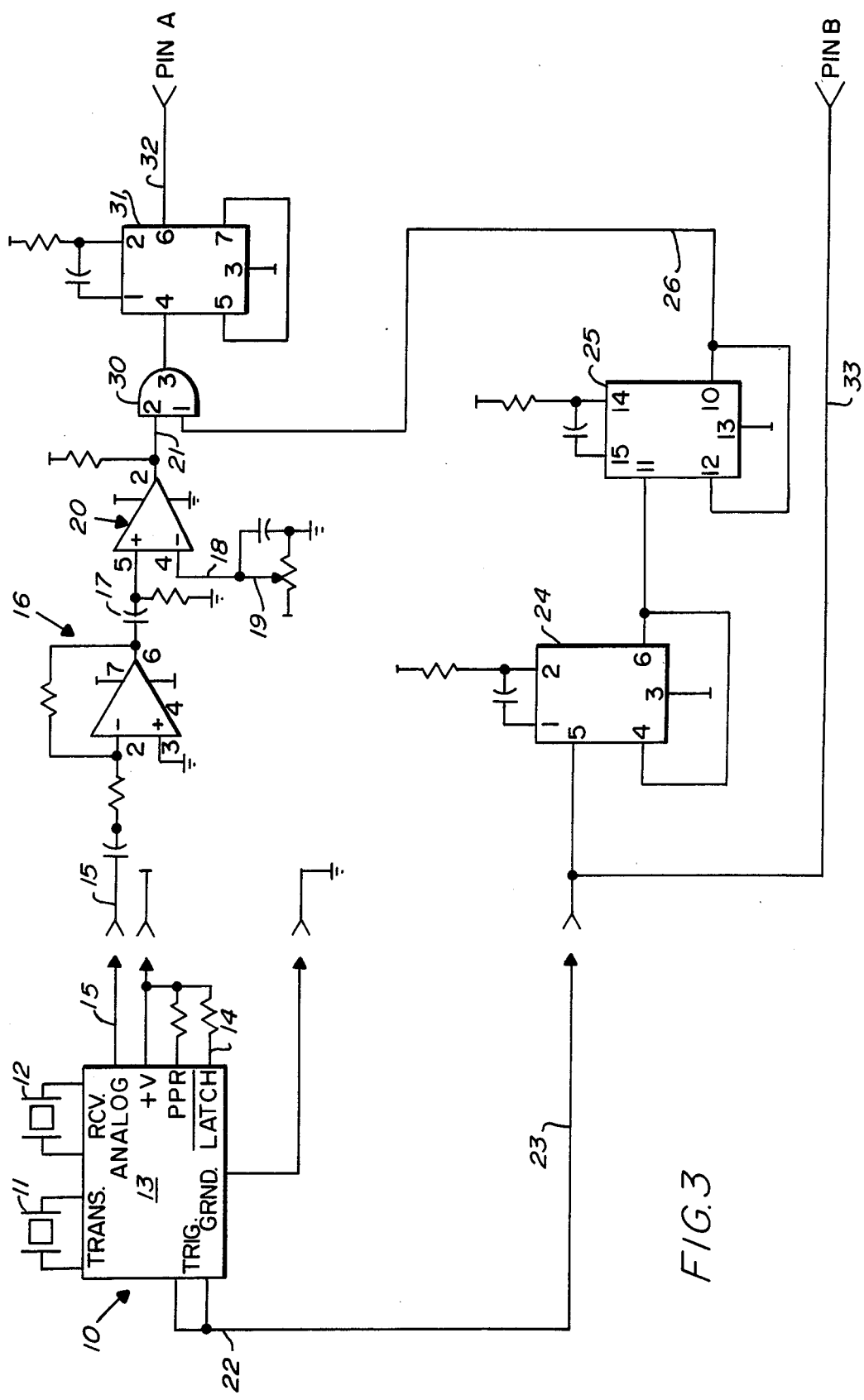
FIG. 3 is a diagram of the input interface circuit according to the invention.

In the first circuit, FIG. 3, the analog output 15 from the transceiver 10 is inverted by an A.C. coupled amplifier 16 (e.g. LF411CN) which it reaches, e.g., by a 0.1 μfd condenser and a 10,000 ohm resistor. Another 10,000 ohm resistor may be in parallel with the amplifier 16, which may operate on ±15 v. D.C. The output from the amplifier 16 is fed via an R-C coupler 17 via a 0.001 mfd condenser and licensed by a 10,000 ohm resistor to ground to one input of a comparator 20 (e.g., a LM339N to which +15 v. D.C. is applied).

The other input 18 to the comparator 20 comes from an adjustable threshold set 19 and provides a D.C. voltage which sets the threshold level which the return echo must exceed before an output pulse is produced at a line 21. For example, +15 volts may be applied to a 10,000 ohm voltage clinch that is placed in parallel with a 0.1 mfd condenser.

The trigger output 22 from the transceiver 10 is fed by a line 23 to two one-shot multivibrators 24 and 25 in series; they may be CD4098BE. The first multivibrator 24 produces a 0.5 ms pulse which disables the detector during the time the transducer 11 is ringing from the transmit pulse. The second one-shot multivibrator 25 produces a 5.0 ms positive pulse at line 26, and during this 5.0 ms time interval a valid echo may be detected.

An output signal in line 26 from the second one-shot multi-vibrator 25 and the output in line 21 based by a 3000 ohm resistor to a +15 volts) from the comparator 20 are fed to an AND gate 30 such as a CD4081BE. When an echo is present during this time window, a positive pulse is generated by the AND gate 30 and drives another one-shot multivibrator 31, which may also be a CD4098BE, which generates a 10.0 ms carry-out pulse in line 32, so that only the first echo is detected in each transmit/receive cycle. The output line 32 and a branch 33 of the trigger output line 23 lead to the second circuit, joins A and B.

Figure 4:
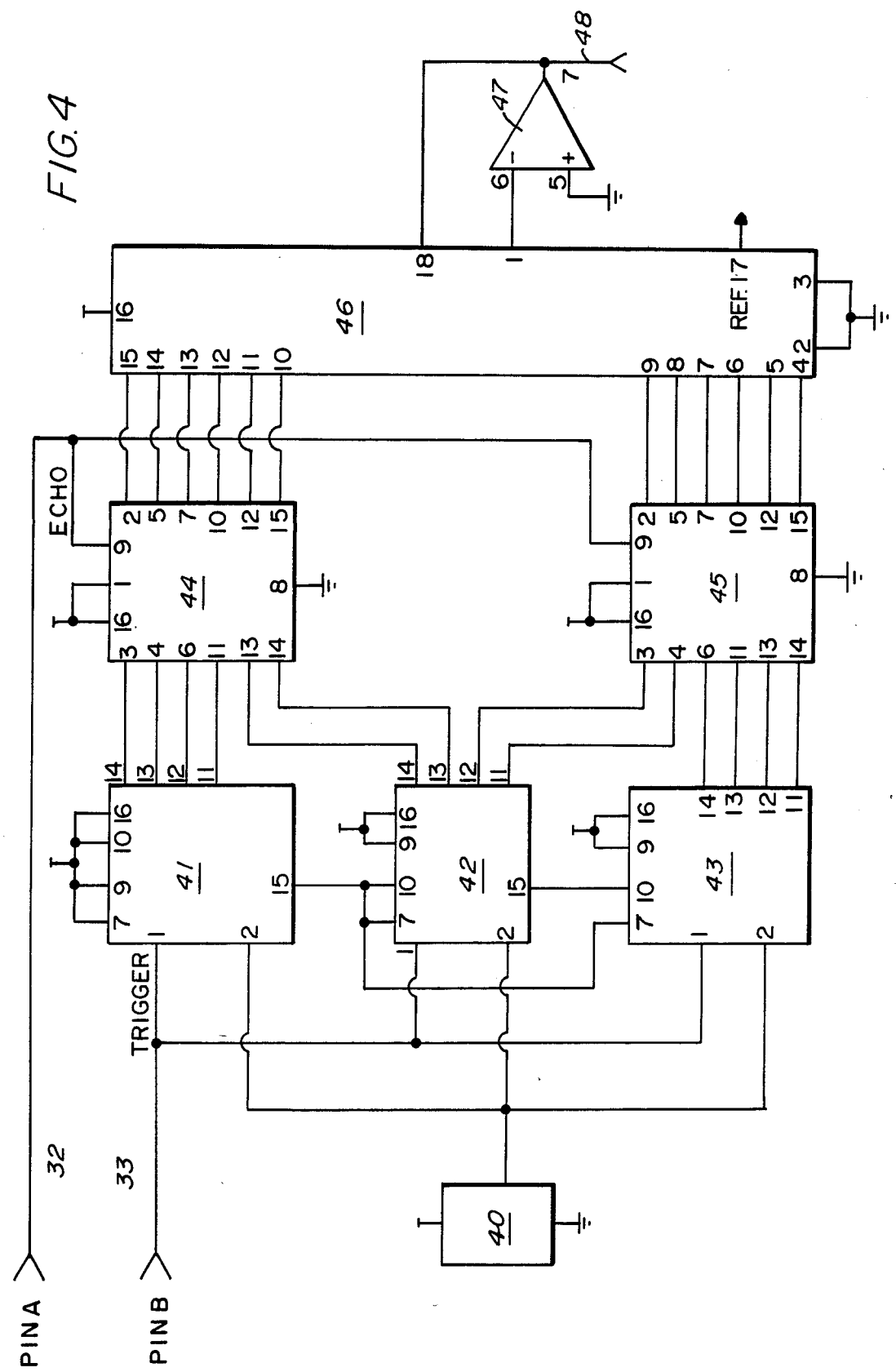
FIG. 4 is a diagram of the counter and multiplying digital-to-analog converter circuit according to the invention.

In the second circuit, shown best in FIG. 4, clock pulses are generated by a hybrid 1.000 MHz. crystal oscillator module 40, and the signal is fed to three, four-bit binary counters 41, 42, and 43 (e.g., CD40163 BE) wired in series. The binary outputs are connected to two, Hex "D" type flip-flops 44 and 45 (e.g., CD40174 BE) The output from the flip-flops 44 and 45 go to the inputs of a twelve bit, four-quadrant multiplying digital-to-analog converter 46 (e.g., AD7541BD or DAC1218LCD) from which an operational amplifier 47 provides the analog output at 48.

The counters 41, 42, and 43 are set to zero and restarted each cycle by the trigger output 22 of the transceiver 10, via lines 23 and 33. Data is transferred from the input to the output of the flip-flops 44 and 45 by the positive going edge of the received pulse in line 32 from the 10 ms one-shot 31 of the first circuit. If an echo is not received during a transmit/receive cycle, the last echo received is retained in the flip-flop output.

The reference voltage for the multiplying digital-to-analog converter 46 is obtained by means of the third circuit (FIG. 5) in the temperature compensation circuit. Temperature compensation and scaling of the converter 46 are accomplished in the third circuit by applying a temperature-dependent voltage to the reference input of the multiplying digital-to-analog converter 46. An Analog Devices two-terminal I.C. temperature sensor-transducer 50 (e.g., AD590K) is used to detect the outside ambient temperature. The output voltage from the transducer 50 is amplified by a scaling amplifier 51 (e.g., LF412CN) and a D.C. offset is inserted. A calibration potentiometer 53 is also provided to calibrate the transducer 50. When the variable voltage from the amplifier 51 is applied to the multiplying digital-to-analog converter 46 via a line 54, the output is scaled to +0.25 volts/inch regardless of temperature.

The linear, temperature corrected voltage is proportional to the distance of a target from the piezoelectric transducer. The circuit has a resolution of 0.013 inches, a minimum range of 3 inches, and a maximum range of 26 inches.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A continuous distance determining detector for determining the distance from said detector to a target, including in combination:

a piezoelectric ultrasonic transceiver, having a pulse transmitter for sending a sonic pulse signal to said target, a pulse receiver for receiving a reflection of said pulse signal from said target, means for generating a voltage signal corresponding to the time between said transmission of said pulse signal and receipt of said reflected signal, an analog output and a trigger output means for producing a voltage signal at the time of transmission of said sonic pulse, comparator means for comparing the voltage value of said analog output signal with a threshold level which must be exceeded by said analog output voltage before effect is given thereto, disable means connected to said trigger output for disabling detection during transmission of the transmitter pulse, enable means connected to the disable means for producing a time interval during which said analog output signal is valid, an AND gate connected to said comparator means and to said enable means, clock means for generating clock pulses, counter means connected to said clock means for counting said clock pulses, flip-flop means connected to said counter means and to the output of said AND gate and providing an output voltage, temperature sensing means for sensing the ambient temperature, temperature compensation and scaling means connected to said temperature sensing means for converting said ambient temperature into a correction voltage scaled to relate the ambient temperature to the output voltage of said flip-flop means, and multiplying digital-to-analog converter means connected to said flip-flop means and to said temperature compensation and scaling means for correcting the output voltage value of said flip-flop means in accordance with the effect of said ambient temperature, and for determining a corrected value for the distance from said detector to said target.

2. The detector of claim 1 having first amplifying means between said transceiver and said comparator means, and second amplifier means for the output from said converter means.

3. The detector of claim 2 having means for adjusting said threshold level for said comparator means.

4. A method for instantaneously determining distance of an object from a given point, comprising:
   transmitting from said given point a piezoelectric ultrasonic pulse to said object,
   receiving the reflected pulse back therefrom at said given point,
   producing an analog output voltage therefrom,
   comparing said analog output voltage with a threshold level which must be exceeded by said analog output voltage before effect is given thereto,
   disabling detection during transmission of the transmitter pulse,
   enabling detection for a time interval during which said analog output is valid,
   applying the disable-enable outputs and the comparing output to an AND gate,
   generating clock pulses,
   counting said clock pulses,
   actuating the counting upon transmission of said pulse and de-actuating it upon receiving said pulse, to give the count during the interval between transmission and receiving,
   determining the distance from the counts by comparing the time taken with the known speed at which the pulse travels, and
   employing a multiplying analog-to-digital converter to temperature compensate the distance obtained from said determining step for validating the output thereof over a wide range of ambient temperatures and giving an accurate value of said distance of said object from said given point.

5. The method of claim 4 including the preliminary step of adjusting the threshold voltage level for said comparing step to proper value for the type of said object to which said method is applied.

* * * * *